(12) United States Patent
Georgiev et al.

(10) Patent No.: US 9,390,505 B2
(45) Date of Patent: Jul. 12, 2016

(54) METHOD AND APPARATUS FOR GENERATING PLENOPTIC DEPTH MAPS

(71) Applicant: QUALCOMM Incorporated, San Diego, CA (US)

(72) Inventors: Todor Georgiev, San Diego, CA (US); Zhan Yu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 31 days.

(21) Appl. No.: 14/568,023

(22) Filed: Dec. 11, 2014

(65) Prior Publication Data

US 2015/0193937 A1   Jul. 9, 2015

Related U.S. Application Data

(60) Provisional application No. 61/915,071, filed on Dec. 12, 2013.

(51) Int. Cl.
*G06K 9/00* (2006.01)
*G06T 7/00* (2006.01)

(52) U.S. Cl.
CPC ..... *G06T 7/0065* (2013.01); *G06T 2207/10024* (2013.01)

(58) Field of Classification Search
None
See application file for complete search history.

(56) References Cited

U.S. PATENT DOCUMENTS

| 8,619,082 | B1* | 12/2013 | Ciurea | H04N 13/0022 345/427 |
| 8,780,113 | B1* | 7/2014 | Ciurea | H04N 13/0022 345/427 |
| 2014/0092281 | A1* | 4/2014 | Nisenzon | H04N 13/0232 348/262 |

OTHER PUBLICATIONS

Yu et al., "Plenoptic depth map in the case of occlusions", Proc. SPIE 8667, Multimedia Content and Mobile Devices, 86671S (Mar. 7, 2013).*
Pérez et al., "Simultaneous estimation of super-resolved depth and all-in-focus images from a plenoptic camera", Proc. of the 3DTV Conference, 2009.*

* cited by examiner

*Primary Examiner* — Feng Niu
(74) *Attorney, Agent, or Firm* — Knobbe, Martens, Olson & Bear, LLP; James R. Gambale, Jr.

(57) ABSTRACT

Described is systems and methods for determining the depth of pixels captured in a plenoptic image. The systems and methods may provide a plurality of views of each pixel location in the plenoptic image. One way of providing the plurality of views is to obtaining pixel intensities from the views for each pixel location in the plenoptic image. A variance can then be calculated of the distribution of pixel intensities for each pixel position. If the variance is below a predetermined threshold, the systems may mask out at least one depth plane and then recalculate the variance in the distribution of pixel intensities to determine if the variance is below the threshold.

20 Claims, 9 Drawing Sheets

METHOD AND APPARATUS FOR GENERATING PLENOPTIC DEPTH MAPS

INCORPORATION BY REFERENCE TO ANY PRIORITY APPLICATIONS

The present application claims priority under 35 U.S.C. §119(e) to U.S. Provisional Patent Application No. 61/915,071, filed on Dec. 12, 2013. Provisional Application No. 61/915,071 is hereby expressly incorporated by reference herein.

BACKGROUND

1. Field

The present invention generally relates to systems and methods for generating high quality plenoptic depth maps from captured images that have occluded portions of the image.

2. Related Art

In traditional photography, the area of focus of an image is configured prior to taking the picture. After the picture has been taken, the area of focus is set and the area which is out of focus cannot be made in focus. Conversely, a light-field, or a plenoptic camera, uses special lenses and sensors to capture the entire light field within the scope of a scene. Thus, a plenoptic camera is able to capture all the light traveling in every direction in every point in space. With a plenoptic camera, since the color, direction, and intensity of all light is captured, focusing is performed using software after the picture has been taken. Focusing after the picture has been taken allows the user to modify the area of the image which is in focus at any time.

In many plenoptic cameras, light enters a main (objective) lens and is then directed through an array of small microlenses to an image sensor. Each microlens may have a relatively small size, such as 100 µm, and a relatively large depth of field. This allows the camera to be focused on almost all points in a scene by capturing a series of small images from slightly different viewpoints. These viewpoints through elements of the microlens can later be extracted and manipulated by special software in order to reach a certain depth of field during post-processing. Such small handheld plenoptic cameras have now become commercially available, such as from Lytro, Inc. (Mountain View, Calif.).

Plenoptic cameras are configured to use a microlens array to capture the 4D radiance of a scene of interest. The acquired radiance, as an integral image, can be processed for either 3D scene reconstruction or synthesizing dynamic depth of field (DoF) effect. There are numerous applications for this emerging camera technology, ranging from entertainment to depth recovery for industrial and scientific applications. Some light field cameras can captures 20 different views of a scene with a 10 megapixel sensor (Adobe®, San Jose, Calif.). However, the rendered 700×700 images may have visible artifacts at occlusion boundaries. The Lytro® light field (lytro.com) camera uses an 11 megapixel sensor to acquire the radiance. However, the images generated from the camera still suffer from a low resolution of one megapixel, with some visible artifacts found around thin objects and sharp edges.

SUMMARY

One embodiment is a method for determining the depth of pixels captured in a plenoptic image, wherein the plenoptic image provides a plurality of views of each pixel location. This embodiment includes: obtaining pixel intensities from a plurality of views for each pixel location in the plenoptic image; calculating a variance in the distribution of pixel intensities for each pixel position; and determining if the variance is below a predetermined threshold, wherein if the variance if below the threshold, masking out at least one depth plane and recalculating the variance in the distribution of pixel intensities to determine if the variance is below the threshold.

Another embodiment is a system for determining the depth of pixels captured in a plenoptic image, wherein the plenoptic image provides a plurality of views of each pixel location, comprising processor executed instructions. These instructions perform a method of: obtaining pixel intensities from a plurality of views for each pixel location in the plenoptic image; calculating a variance in the distribution of pixel intensities for each pixel position; and determining if the variance is below a predetermined threshold, wherein if the variance if below the threshold, masking out at least one depth plane and recalculating the variance in the distribution of pixel intensities to determine if the variance is below the threshold.

Another embodiment is a system for determining the depth of pixels captured in a plenoptic image, wherein the plenoptic image provides a plurality of views of each pixel location. This embodiment includes: means for obtaining pixel intensities from a plurality of views for each pixel location in the plenoptic image; means for calculating a variance in the distribution of pixel intensities for each pixel position; and means for determining if the variance is below a predetermined threshold, wherein if the variance if below the threshold, masking out at least one depth plane and recalculating the variance in the distribution of pixel intensities to determine if the variance is below the threshold.

An additional embodiment is a non-transitory computer readable medium comprising instructions that when executed by a processor perform a method of: obtaining pixel intensities from a plurality of views for each pixel location in the plenoptic image; calculating a variance in the distribution of pixel intensities for each pixel position; and determining if the variance is below a predetermined threshold, wherein if the variance if below the threshold, masking out at least one depth plane and recalculating the variance in the distribution of pixel intensities to determine if the variance is below the threshold.

BRIEF DESCRIPTION OF THE DRAWINGS

FIG. 8A shows the captured integral image.

FIG. 8B shows a synthesized integral image using the depth map. FIG. 8C shows an example of rendering using the captured image 8A. FIG. 8D shows an example of rendering using the synthesized image 8B.

DETAILED DESCRIPTION

Embodiments of the invention relate to systems and methods of capturing images with a plenoptic camera having a relatively small number of views. In some cases, the plenoptic camera may be part of a cellular telephone, and thus size constrained to fit within a compact package. These embodiments can produce a refocusable high resolution final image by generating a depth map for each pixel in the sparse set of views captured by the plenoptic camera. However, as discussed above, when using images that are captured from a plenoptic camera with multiple views, one obstacle to recovering a high-resolution pixel depth map is occlusions that are formed when pixels from one view are occluded in another view. This may happen, for example, when one view captures a pixel from the blue sky, but in another view that same pixel is occluded by a tree branch. To robustly resolve these pixels to a particular depth in a depth map, embodiments of the invention analyze the behavior of pixels in such occluded situations.

As described in detail below, images that have severely occluded pixels can use embodiments of the invention to properly assign the occluded pixels to different depth layers based on statistics generated for each pixel within each depth plane of the depth map. In this processes, the proper depth of each pixel may be estimated by discretizing the depth in the scene and conducting plane sweeping. In one embodiment, for each given depth of a pixel within the depth map, all corresponding pixels at that depth are gathered from other views in the plenoptic image, and then the in-focus pixels are modeled as a Gaussian distribution. The system may then iteratively mask out different depth layers and check for a minimum variance of each pixel captured in the multiple views. The same pixel in each view should have approximately the same color. Thus, if a depth layer having an occluded view of the pixel is masked out, the variance in color of that pixel will be minimized. After iteratively masking out depth layers and continuing to analyze the color variance of each pixel, the system can determine the proper depth plane for occluded pixels. Using this process, the system can distinguish occluded pixels and in-focus pixels in order to find the proper depths of each pixel in the image. Final depth maps may be computed in real scenes captured by a mobile plenoptic camera having a sparse set of views.

Figure 1:
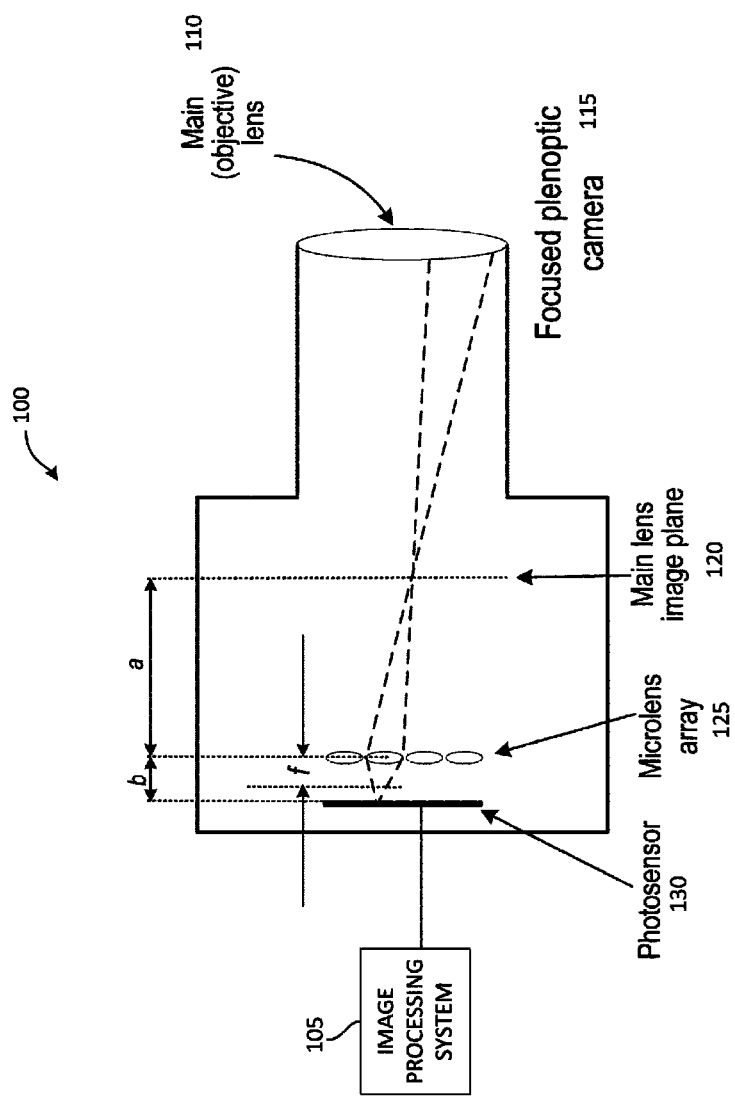
FIG. 1 is a schematic block diagram of one embodiment of a plenoptic camera linked to an image processing system.

FIG. 1 is a block diagram of a plenoptic imaging system 100 that includes a plenoptic camera 115 that is linked to an image processing system 105. The image processing system 105 is configured to process images that are captured by the plenoptic camera 115. Within the plenoptic camera 115 is a main objective lens 110 that receives light rays from a scene or object of interest. After passing through the main objective lens 110, the light traverses an image plane 120 before contacting a microlens array 125. The light beams cross the microlens array 125 and are then focused onto a photosensor 130. The image processing system 105 is in electronic communication with the photosensor 130 in order to record the pixel values being measured on the photosensor 130 from each microlens in the microlens array 125. After a target image is captured on the photosensor 130, the image processing system 105 calculates the proper depth for each pixel in the array, as discussed below, in embodiments of the invention.

Figure 2:
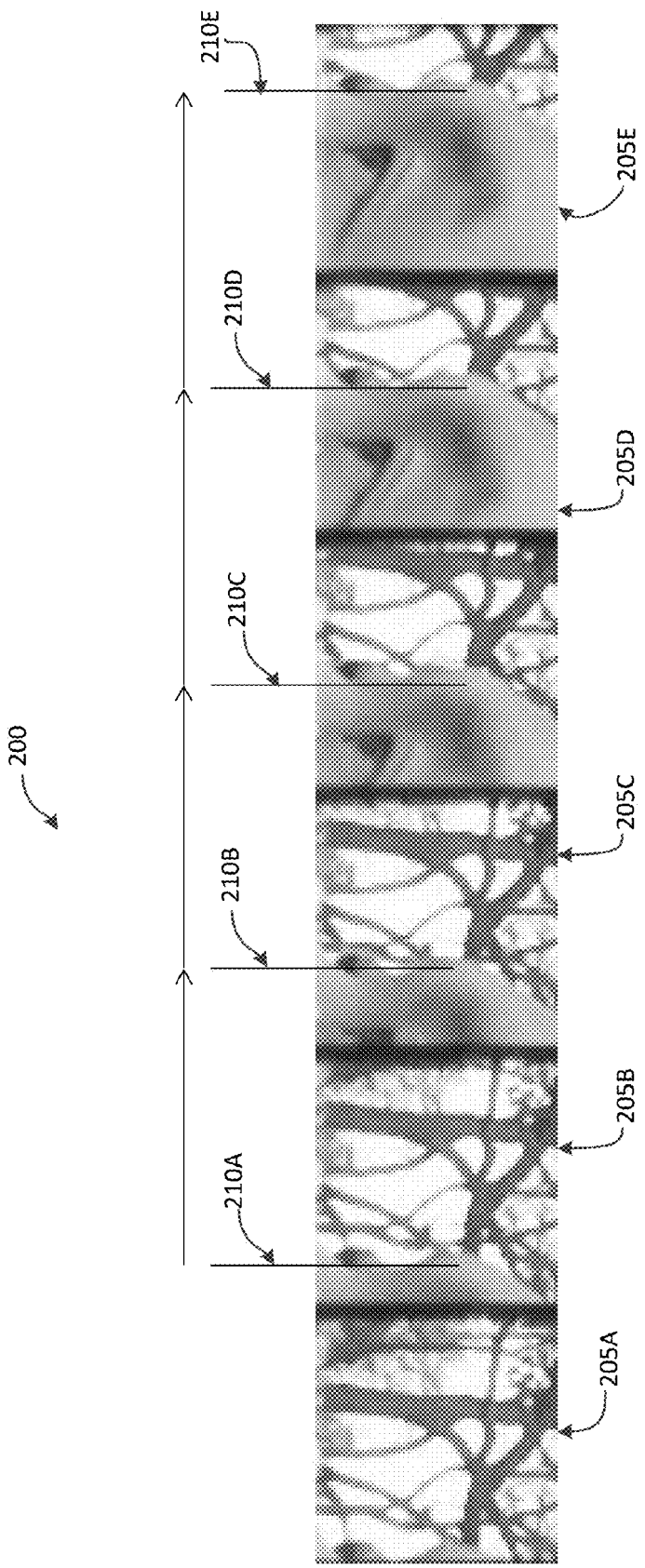
FIG. 2 is a series of plenoptic images taken at the same time.

As mentioned above, one challenge in calculating the proper pixel depth for images taken from the plenoptic camera 115 is that there may be occlusion of some pixels between the images that are captured from each microlens. As shown in FIG. 2, a series of plenoptic images 200 captured from a series of different microlenses is shown having five different points of view. Each different point of view, 205A-E, is captured because each microlens is positioned at a slightly different angle with respect to objects in the captured scene. In the set of images 200, each image 205A-205E shows a shifting of the person's forehead 210 with reference to a background, resulting in a change in what branch portion is covered. For example, the pixel value found on the forehead at point 210A remains essentially the same across all images 205A-E. Thus, this shallow depth pixel corresponding to the forehead pixel does not change much within each captured image, and thus its depth can be more easily calculated.

Figure 3:
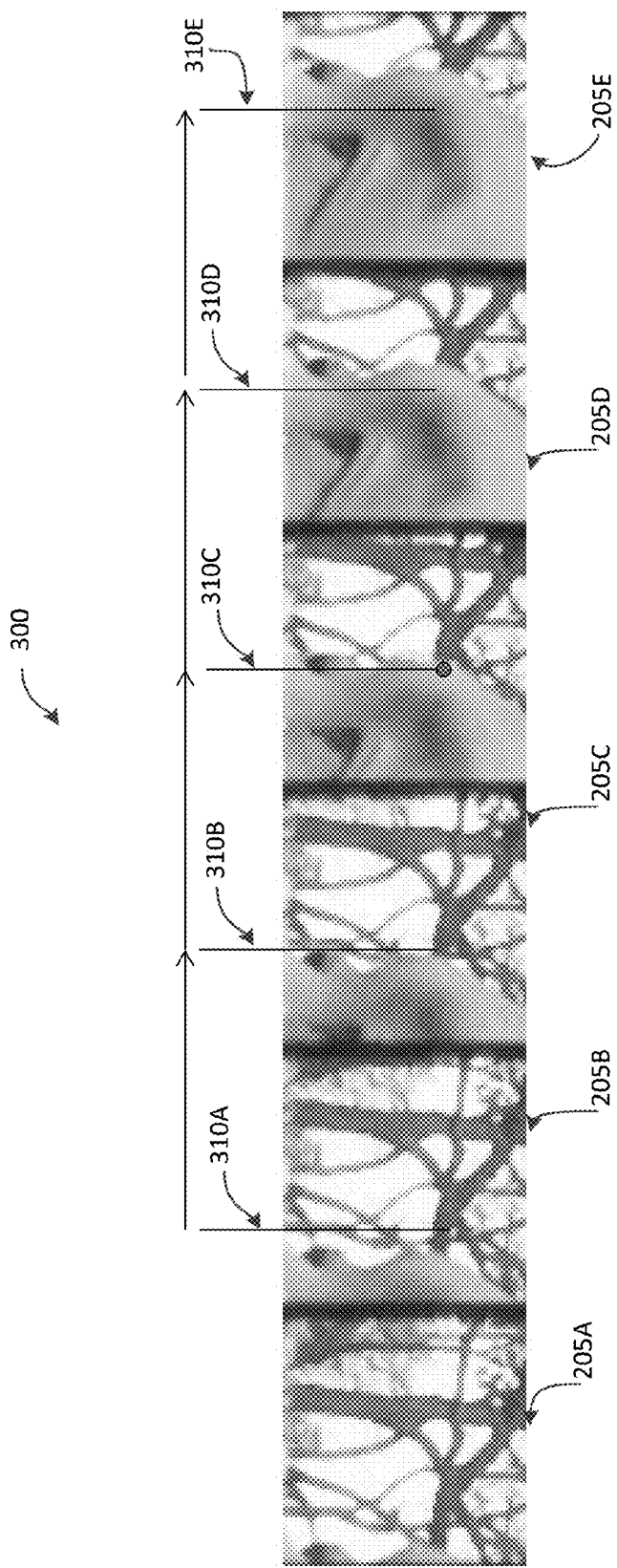
FIG. 3 is a series of plenoptic images taken at the same time and illustrating how features within the image at differing depths can be covered or uncovered.

However, referring now to FIG. 3, it can be seen that within images 205A-E there are also branches that are positioned more towards the background, and the pixels corresponding to the branch change within the different images captured at the differing perspectives. For example, it can be seen that a tree branch pixel at points 310A and 310B is seen easily in each picture. However at point 310C, the same pixel is now occluded by the image of the forehead at this angle. In addition, the other images taken at points 310D and 310E have the same issue in that the branch pixel is no longer found, and the forehead has completely occluded the values of the branch pixel captured by the image at point 301A.

As mentioned above, in systems that are size constrained, such as compact cell phones, the system may only be able to capture data from a relatively few number of pixels through each microlens. For example, whereas typical plenoptic cameras may focus microlens images onto an image sensor at a size of 75×75 pixels per microlens, a more constrained camera may only be able to capture 10×10 pixels per microlens. Alternatively, the constrained system may still use microlenses that capture 75×75 pixel images, but have many fewer microlenses overall in the captured image.

As the resolution or number of microlenses decreases it becomes increasingly more difficult to determine the proper depth of each pixel in the image. In addition, there is a reduced ability of the system to be able to smooth the transitions from one microlens to another in the final generated image because there are relatively fewer pixels to use within any smoothing operation. Accordingly, embodiments of the invention provide systems and methods for more accurately determining the depth of each pixel within the captured images.

Embodiments of the invention relate to systems and processes that increase spatial resolution in the design and interpolation of the angular resolution of an image in post processing. These systems and processes are useful because capturing a relatively high number of views is still impractical due to special requirements of ultra-thin cameras that can be manufactured for relatively low costs. By using the embodiments described herein, the inexpensive but high resolution sensor of low cost cameras can be used to build high quality multi-view systems on mobile devices. Such a camera can produce a refocusable high resolution final image if a depth map is generated for every pixel in a sparse set of views.

In one embodiment, once the multi-view images are captured, the system generates a depth map for each pixel. To robustly resolve the depth map embodiments first analyze the behavior of pixels in different occlusion situations. Then, even under severe occlusion, the process can still distinguish different pixel depth layers based on a statistical analysis, as described in more detail below. The depth of each pixel can be estimated by discretizing the depth in the scene and conducting plane sweeping. More specifically, for each given pixel depth, the system gathers all corresponding pixels from other views captured by the camera and then models the in-focus pixels as a Gaussian distribution. To resolve the occlusion issue among different views, the system can apply an iterative process to accurately estimate depth layers from the closest to the furthest, so that the occluded pixels will be masked out when estimating local minima.

Pixels on constant color surfaces tend to choose incorrectly small disparity since such disparity will lead to smaller variance. To avoid these trivial solutions, the system can globally optimize an edge mask solution, as discussed below. Experimental results showed that this process was able to recover an accurate depth map from the integral image of real scenes captured by a plenoptic camera with a sparse set of lenses.

Depth Estimation from Radiance

To estimate the scene depth based on the captured integral image, without loss of generality, we consider the behavior of a pixel p0 in the integral image. This pixel represents view v0, and is related to different sets of pixels when assigning different depth d to it.

No Occlusion

Figure 4B:
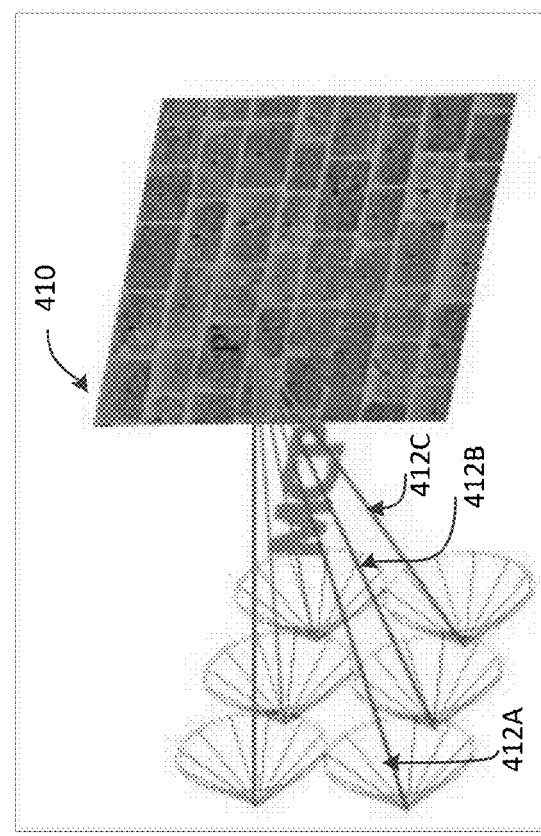
FIGS. 4A and 4B are schematic drawings of colors sampled by cameras without (FIG. 4A) or with (FIG. 4B) an occlusion due to the letters between the wall and the camera.
Figure 4A:
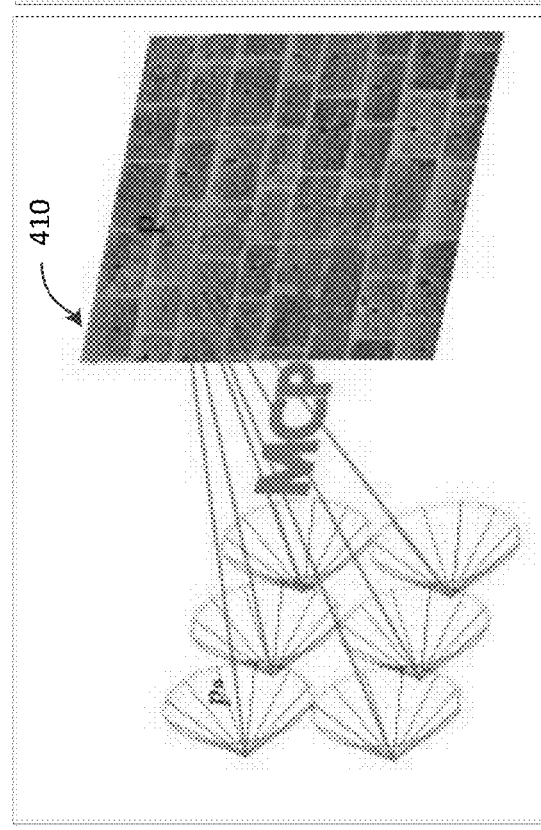

Consider FIG. 4A, where we assume all the surfaces in the scene are Lambertian, and thus have a similar apparent brightness when viewed from any angle. If pixel p0 is assigned the correct depth d, it maps to a point P on a surface 410. All rays emitted from P have constant color. Therefore, rays captured by any other view vi at pixel pi will have the same color as p0. On the other hand, if an incorrect depth d is assigned to p0, then the corresponding pi will tend to have different color than p0. With this observation, when assigning a depth dj to a pixel, distribution of color over all pixels from different views can be modeled as a unimodel Gaussian distribution to further compensate for the vignetting effect and camera noise. The variance of the distribution defines the probability of the p0 is actually lying on di. It is computed by:

$$V_{p_0, d_j} = \frac{\sum (I_{p_i} - \bar{I})^2}{N},$$

where $I_{P_i}$ is the intensity of pi and N is the number of pixels associated. If $V_{P_0, dj}$ is small, meaning all the pixels have almost the same color, the probability of $p$0 having depth $d_j$ is high.

Depth Estimation with Occlusion

Now consider FIG. 4B, where some of the views looking at P' are occluded by the text "MCP 2013". In this case, even with a correctly assigned depth, due to occlusion, rays 412A-C emitted from the front surfaces replace the correct rays from the back surface 410, resulting in high variance in our Gaussian model. To resolve this issue, it can be assumed that occlusion surfaces have similar color and model the problem with a bimodel Gaussian distribution. This approach can be extended to a N-model Gaussian distribution but deciding N can be challenging. However, having similar color on all occlusion surfaces is a rather extreme assumption. Moreover, under a small number of views, sometimes there are not enough pixels to form Gaussian distribution. The current state of the art globally consistent depth labeling method proposes global labeling constraints on epipolar plane images (EPI). It requires a densely sampled radiance (at least 17×17) in order to estimate local direction on the EPI. Therefore this process does not fit our sparse sampling situation. However, to show the robustness of embodiments of our process, we still compare our result with this process by providing more views. Next, we analyze the distribution of pixel intensities. In the regular case, images of P are still captured by some of the views. In this case, the Gaussian distribution still holds, but with noise around the region far from the mean. It is possible to explicitly separate out the occlusion samples or implicitly model this distribution as N-modal. However, in the extreme case where most samples are from occlusion surfaces, it is almost impossible to tell which samples are from the in-focus plane from a single observation.

Instead of trying to point out which samples are outliers directly from a single observation under a given depth, the process may iteratively mask out the layers that are in front of P. Thus, for each iteration, all the depth values are still looped over to check for the minimum variance for each pixel. The difference is that starting from the second interaction, the system uses the current depth map and when testing depth $d_i$ on P, the process ignores pixels that have smaller depth than $d_i$.

DESCRIPTION OF DETAILED PROCESS

Embodiments of the invention first assume that the scene depth in the captured image is from $d_{min}$ to $d_{max}$, and that there are a sufficient number of views to form different distributions of pixels when assigned with different disparities. In this process it is also assumed that if all the occlusion pixels are masked out, the intensity distribution will achieve minimum variance at the correct depth value. In the first iteration, the system can successfully find the local minimum for the closest depth since no occlusion will occur on those pixels.

In the next iteration, the system masks out those pixels from the first iteration when computing the depth for all pixels since they are considered as occlusions. Note that pixels at $d_{min}$ may also be assigned depth $d_{min}$ during the first iteration due to occlusion problems. However, by masking out all the pixels at dmin, the process is able to confirm that no pixels from $d_{min}$ will affect the convergence of pixels at $d_{min+1}$. Therefore during the second iteration, all pixels on $d_1$ will be computed under a no occlusion condition. The process then continues and repeats through the remaining depths.

The following is a proof that in each iteration through the process, the calculated estimation is occlusion free.

Figure 5:
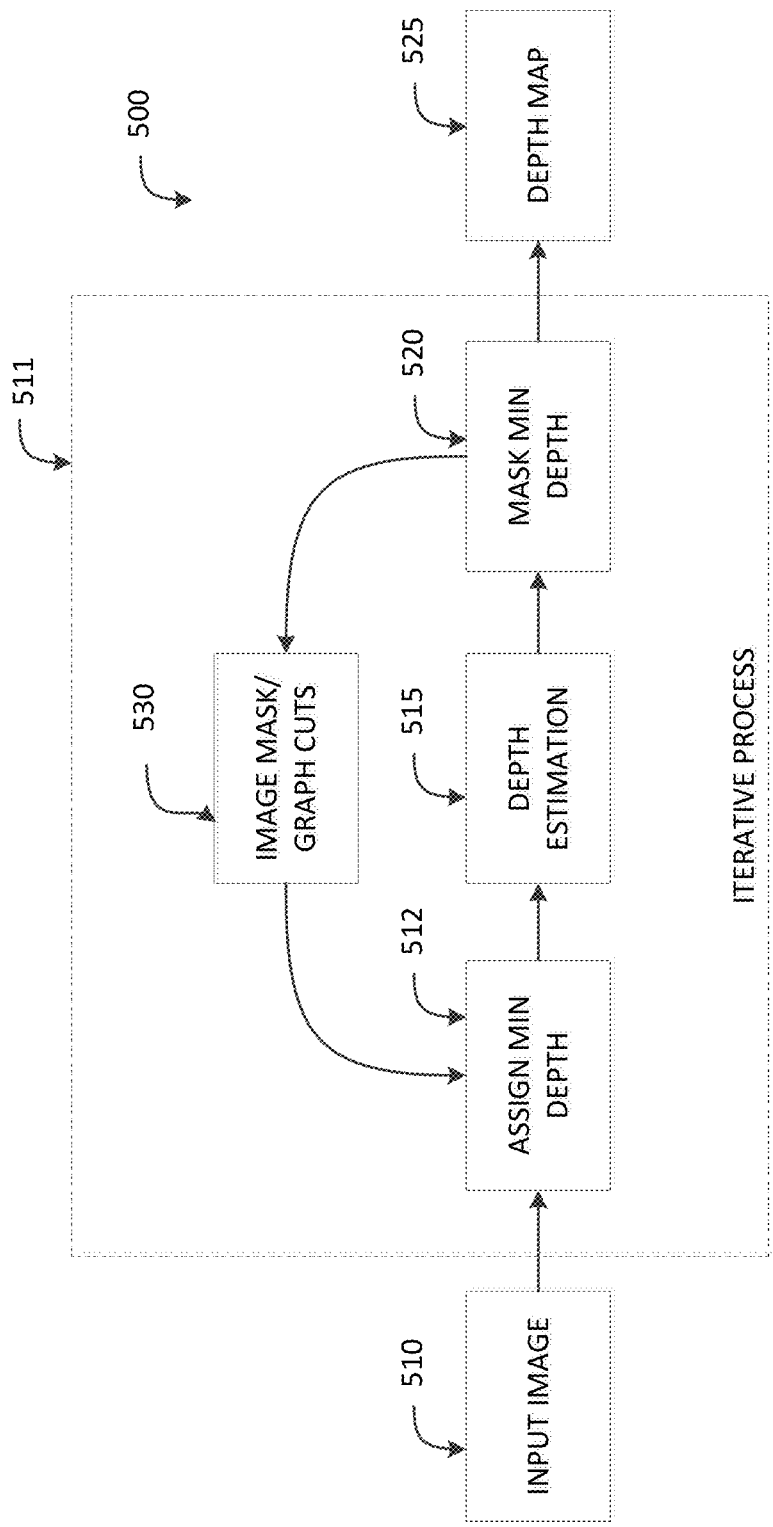
FIG. 5 is one embodiment of a depth estimation pipeline process according to aspects of the invention.

Referring now to FIG. 5, which shows an overview of a process 500 of determining a depth map for pixels in a plenoptic image. First, an input image is read by the camera at a state 510 and input into the image processing system. An iterative process 511 is then started, beginning with iteration 0, to determine the proper depth plane for each pixel in the captured image. In the iterative process 511, an initial minimum depth is chosen at state 512 and assigned to the pixels at that depth.

Base Case.

In iteration 0, all the depths are computed directly using the unimodel Gaussian distribution. Thus starting at the minimum depth, all pixels are assigned to this minimum depth. Then at state 515 a depth estimation is made for all of the pixels at this minimum depth. After calculating the depth estimation, the process 500 moves to state 520 where the pixels at the minimum depth are masked out. In this case, all the pixels at depth plane 0 (d0) will be marked out correctly and the iterative process 511 can continue.

Induction.

Suppose in iteration n, depths smaller than dn are all computed correctly. At iteration n+1, the process will ignore pixels with depths smaller than dn+1. Because of that, pixels with dn+1 are computed with no occlusion.

However, as mentioned above, at each iteration i, pixels not lying on depth di may be incorrectly assigned with di (due to occlusion or other reasons). In this case, in a later iteration, more than the necessary pixels may get masked out, so that with a small disparity, a trivial solution with small variance could be produced for pixels on the constant color surfaces. In this case, another process may be required to either use the boundary pixels to regulate these pixels (global optimization) or use an edge mask to ignore the pixels on the surfaces in a later iteration (edge mask).

Avoiding the Trivial Solution

Note that in each iteration, not only pixels lower than current depth will be masked out; pixels incorrectly marked as having depths lower than the current depth will also be masked out due to occlusion. To resolve this issue, the process 500 moves to a state 530 wherein two solutions can be utilized: (1) an edge mask to mark those surfaces subject to occlusion, and (2) a global optimization process using Graph Cuts (GCs).

Edge Mask

At state 530 of the process 500, an iterative loop is begun, generally on the edge pixels only. Usually, more than 2 iterations of the process 511 are conducted for an input image. To avoid occlusions, the process sweeps through all trial depths from low to high and compute the variance at each depth by not using pixels that have disparity higher than the current disparity. In each iteration in the process 511, the depth at each pixel is updated to be the disparity at a lowest variance and then the process continue with another iteration. Typically 5 iterations are sufficient to produce good results.

Global Optimization

Constant color surfaces in the scene may be a problem since it can be difficult to estimate depth directly from them. Traditional global optimization methods, such as graph cuts or belief propagation may use a smoothness constraint to compensate for this issue. For this reason, the process may use the Graph Cuts framework and let the smoothness constraint resolve the trivial solution issue. Specifically, in each iteration, the energy function can be minimized by constructing a graph with data term (variance of pixel intensities) as the links to source/target and a smoothness term (depth difference between neighboring pixels) as links to neighboring pixels. In this case, the process can reuse a min-cut/max-flow process to minimize the energy function. Note that the data term in our case is occlusion free because we do not consider pixels with depth lower than the current depth.

EXPERIMENTS

All experiments were conducted on a PC with Intel Core i7 3.2 GHz CPU and 8 GB memory.

Figure 6:
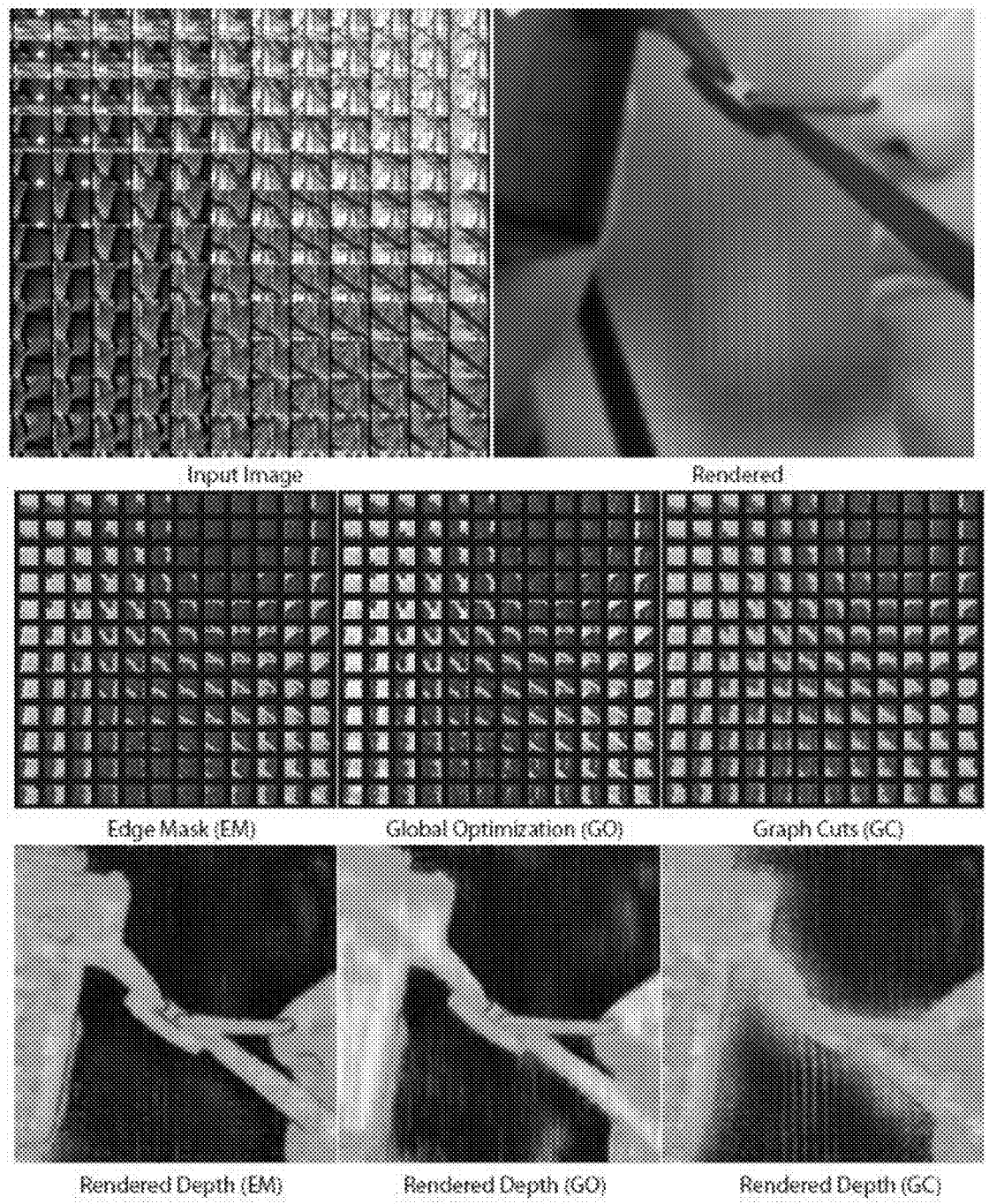
FIG. 6 is a data from a plenoptic camera illustrating an estimated depth map using different methods based on the input integral image of a camera scene
Figure 7:
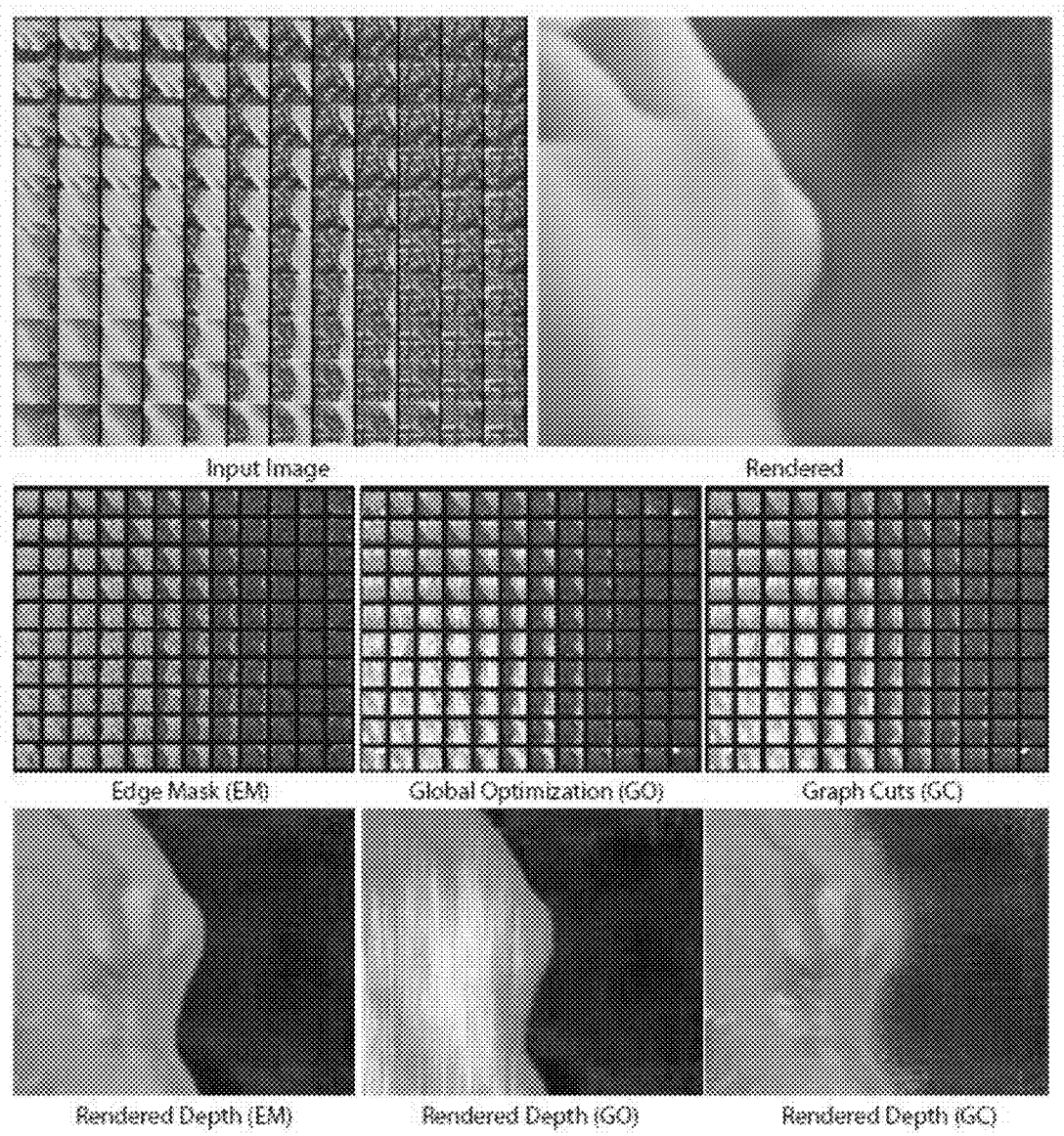
FIG. 7 is data illustrating an estimated depth map using different methods based on the input integral image of a hand scene

The second row of FIGS. 6 and 7 show the depth maps of the captured radiances of a camera scene and a hand scene using embodiments of a method with an edge mask (EM), a global optimization (GO) and brute force graph cuts (GC). On the third row, the result shows examples of the depth map using the plenoptic rendering. GC has very noisy occlusion boundaries, such as can be seen on the edges of the belt (FIG. 6) and the hand (FIG. 7) due to the severe occlusion conditions of the captured image. In contrast, GO and GC both accurately recover fine details and robustly handle the occlusion boundaries. However, the result of EM appears a little bit more variant on surfaces with constant depth but GC better preserves the smoothness of surfaces.

Synthesizing Novel Views

Figure 8A:
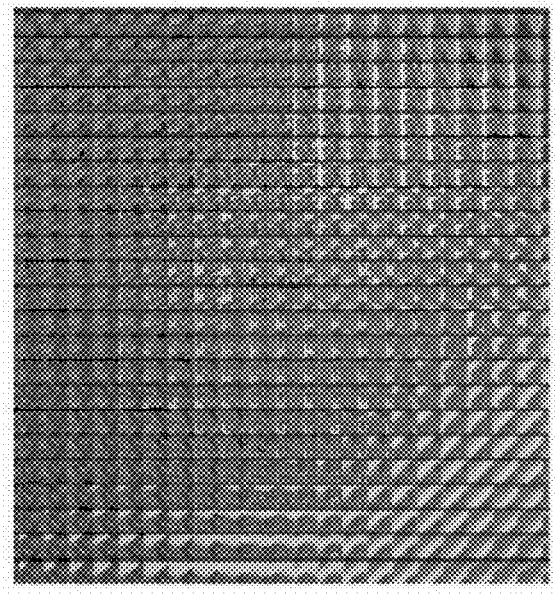
FIGS. 8A-8D show different applications using an estimated depth according to embodiments of the invention.
Figure 8B:
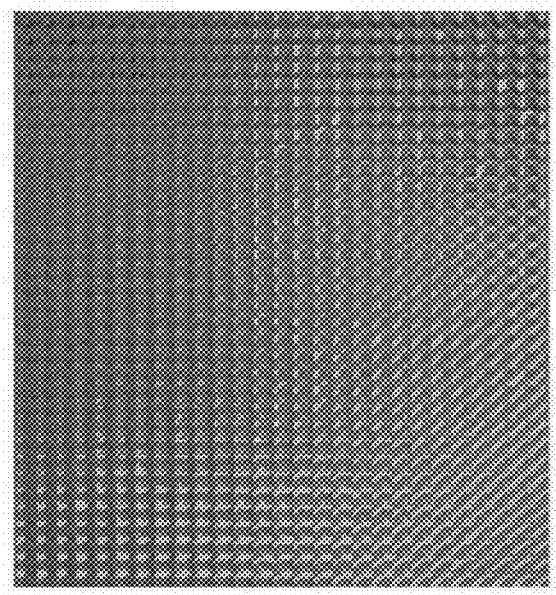
Figure 8C:
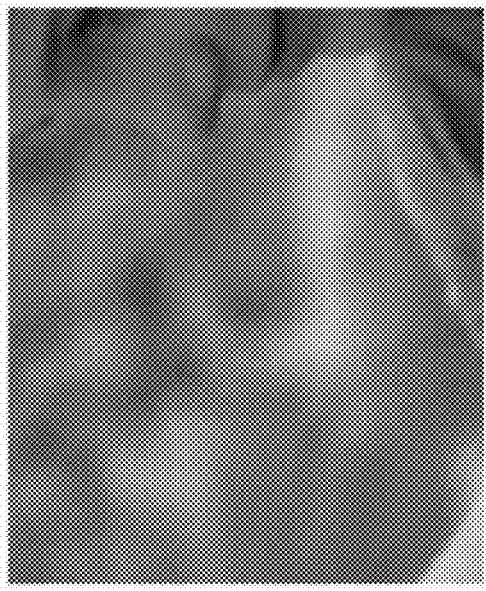

FIG. 8B shows one result of using depth estimated from the input integral image to synthesize arbitrary views representing a new, denser integral image with more views. Given the input image of 25×25 views of a girl in the scene, the system could synthesize a new integral image with 25×25 views that are concentrated in the central area. With the correctly estimated occlusion boundaries, the system was able to faithfully recover the edges of the shown arm, wrinkles on the shirt on the foreground and thin branches and leaves of the trees, in addition to the cover of the bee hives in the background.

Rendering Aliasing Reduced Images

Figure 8D:
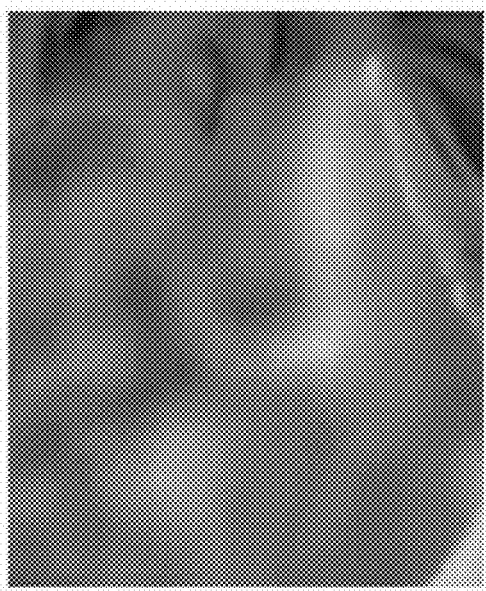

Aliasing in the rendered image is usually caused by undersampling of the radiance. To conduct anti-aliasing, the process can use the computed estimated depth for the radiance to synthesize a densely sampled radiance of 100×100 views. The system can then render the dynamic depth of field effect using the new radiance. As shown in FIG. 8D, compared with the result using the original captured radiance, when focusing on the foreground, embodiments this system were able to greatly reduce the aliasing artifacts on the background and simulating a D-SLR quality image.

Figure 9:
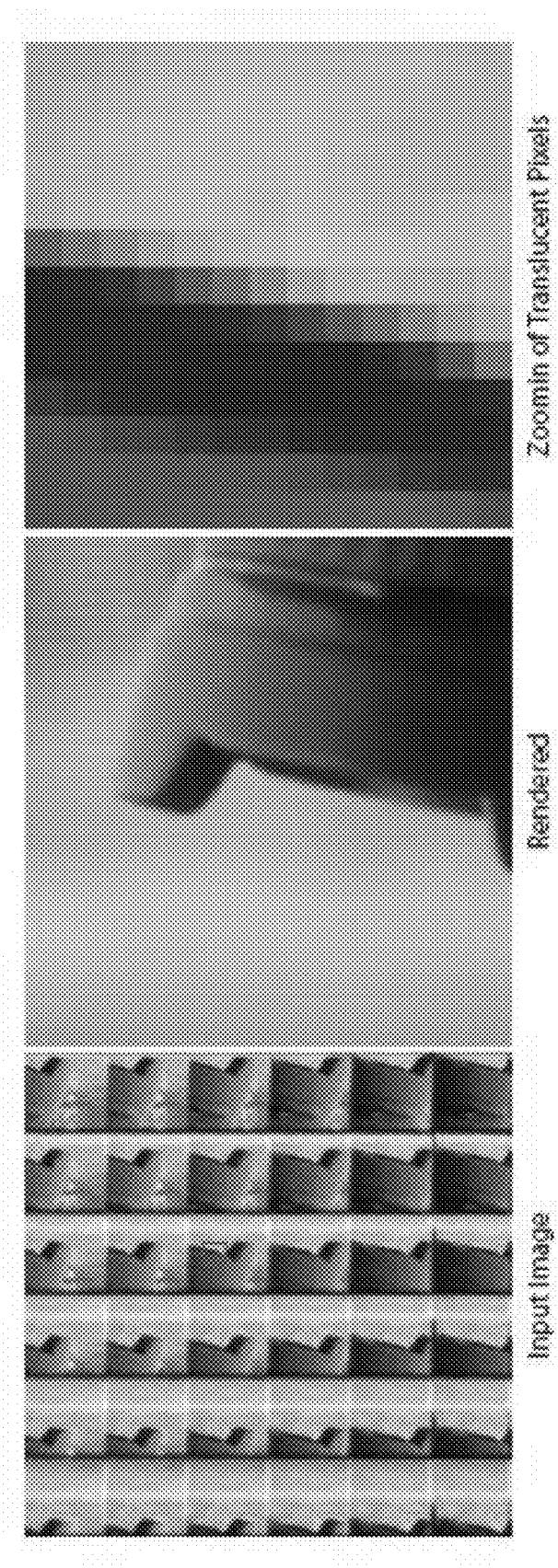
FIG. 9 shows an example of translucent pixels that appear near occlusion boundaries in a captured image.

It is known that boundary pixels may require matting to resolve translucency. Since in the described process each pixel is assigned only one proper depth, the depth for the translucent pixels may not be easily computed. As shown in FIG. 9, embodiments can explore a model of multiple depths per pixel using the described process. In the edge map process described herein, the threshold for the edge map is empirically defined. However, embodiments also include analyzing the statistics of the image to automatically choose appropriate thresholds.

The technology is operational with numerous other general purpose or special purpose computing system environments or configurations. Examples of well-known computing systems, environments, and/or configurations that may be suitable for use with the invention include, but are not limited to, personal computers, server computers, handheld or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-core processor such as a Pentium® processor, a Pentium® Pro processor, a 8051 processor, a MIPS® processor, a Power PC® processor, or an Alpha® processor. In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®.

The system may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system may also be written using interpreted languages such as Perl, Python or Ruby.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A method for determining a depth of pixels captured in a plenoptic image, wherein the plenoptic image provides a plurality of views of each pixel location, comprising:
    obtaining pixel intensities from a plurality of views for each pixel location in the plenoptic image;
    calculating a variance in a distribution of the pixel intensities for each pixel position; and
    determining if the variance is below a predetermined threshold, wherein if the variance is below the threshold, masking out at least one depth plane and recalculating the variance in the distribution of pixel intensities to determine if the variance is below the threshold.

2. The method of claim 1, further comprising iteratively masking out additional depth planes until the pixel intensity variance is below the threshold.

3. The method of claim 2, wherein iteratively masking comprises iteratively masking from a low depth in the image to a high depth in the image.

4. The method of claim 1, further comprising iteratively calculating the pixel variance of edge pixels in the image only.

5. The method of claim 1, wherein in each iteration, an energy function is minimized by constructing a graph of the variance in pixel intensities between source and target pixels.

6. The method of claim 5, further comprising calculating a smoothness term corresponding to a depth difference between a target pixel and its neighboring pixels.

7. The method of claim 6, further comprising optimizing a final image by minimizing the energy function between the target pixels and the neighboring pixels.

8. A system for determining a depth of pixels captured in a plenoptic image, wherein the plenoptic image provides a plurality of views of each pixel location, comprising a processor configured to execute instructions that perform a method of:
    obtaining pixel intensities from a plurality of views for each pixel location in the plenoptic image;
    calculating a variance in a distribution of the pixel intensities for each pixel position; and
    determining if the variance is below a predetermined threshold, wherein if the variance is below the threshold, masking out at least one depth plane and recalculating the variance in the distribution of pixel intensities to determine if the variance is below the threshold.

9. The system of claim 8, further comprising iteratively masking out additional depth planes until a pixel intensity variance is below the threshold.

10. The system of claim 9, wherein iteratively masking comprises iteratively masking from a low depth in the image to a high depth in the image.

11. The system of claim 8, further comprising processor executed instructions that perform a method of iteratively calculating the pixel variance of edge pixels in the image only.

12. The system of claim 8, wherein in each iteration, an energy function is minimized by constructing a graph of the variance in pixel intensities between source and target pixels.

13. The system of claim 12, further comprising processor executed instructions that perform a method of calculating a smoothness term corresponding to a depth difference between a target pixel and its neighboring pixels.

14. The system of claim 13, further comprising processor executed instructions that perform a method of optimizing a final image by minimizing the energy function between the target pixels and the neighboring pixels.

15. A system for determining a depth of pixels captured in a plenoptic image, wherein the plenoptic image provides a plurality of views of each pixel location, comprising:
    means for obtaining pixel intensities from a plurality of views for each pixel location in the plenoptic image;
    means for calculating a variance in a distribution of the pixel intensities for each pixel position; and
    means for determining if the variance is below a predetermined threshold, wherein if the variance is below the threshold, masking out at least one depth plane and recalculating the variance in the distribution of pixel intensities to determine if the variance is below the threshold.

16. The system of claim 15, further comprising means for iteratively masking out additional depth planes until the pixel intensity variance is below the threshold.

17. The system of claim 16, wherein the means for iteratively masking comprises means for iteratively masking from a low depth in the image to a high depth in the image.

18. A non-transitory computer readable medium comprising instructions that when executed by a processor perform a method comprising:
    obtaining pixel intensities from a plurality of views for each pixel location in a plenoptic image;
    calculating a variance in the distribution of pixel intensities for each pixel position; and
    determining if the variance is below a predetermined threshold, wherein if the variance is below the threshold, masking out at least one depth plane and recalculating the variance in the distribution of pixel intensities to determine if the variance is below the threshold.

19. The non-transitory computer readable medium of claim 18, further comprising calculating a smoothness term corresponding to a depth difference between a target pixel and its neighboring pixels.

20. The non-transitory computer readable medium of claim 19, further comprising optimizing a final image by minimizing energy between target pixels and neighboring pixels.

* * * * *